United States Patent [19]

Coetzer et al.

[11] 4,287,269
[45] Sep. 1, 1981

[54] ELECTROCHEMICAL CELL AND ANODE FOR AN ELECTROCHEMICAL CELL

[75] Inventors: Johan Coetzer; Michael M. Thackeray, both of Pretoria, South Africa

[73] Assignee: The South African Inventions Development Corporation, Pretoria, South Africa

[21] Appl. No.: 70,898

[22] Filed: Aug. 29, 1979

[30] Foreign Application Priority Data

Sep. 6, 1978 [ZA] South Africa ............... 78/5067

[51] Int. Cl.³ ............................................. H01M 4/36
[52] U.S. Cl. ................................... 429/103; 429/104; 429/194; 429/218
[58] Field of Search ............................. 429/101–104, 429/218, 194

[56] References Cited

U.S. PATENT DOCUMENTS

| 3,186,875 | 6/1965 | Freeman, Jr. | 136/153 |
|---|---|---|---|
| 3,236,693 | 2/1966 | Caesar | 136/86 |
| 3,266,940 | 8/1966 | Caesar | 136/86 |
| 3,716,409 | 2/1973 | Cairns | 429/103 |
| 3,736,186 | 5/1973 | Liang | 429/104 |
| 3,864,168 | 2/1975 | Casey, Jr. et al. | 136/6 LN |
| 3,915,741 | 10/1975 | Kogiso | 429/102 X |
| 4,076,905 | 2/1978 | Sammells | 429/112 |
| 4,091,182 | 5/1978 | Farrington et al. | 429/101 |
| 4,164,608 | 8/1979 | Coetzer | 429/50 |

OTHER PUBLICATIONS

K. Seff, "The Crystal Structure of a Sulfur Sorption Complex of Zeolite 4A", J. Phys. Chem. 76, 2601 (1972).

Primary Examiner—Charles F. Lefevour
Attorney, Agent, or Firm—Arnold, White & Durkee

[57] ABSTRACT

An electrochemical cell and an anode for use in an electrochemical cell are disclosed. The cell in its charged state comprises an anode, a cathode and an electrolyte. The anode comprises a polysulphide or a polyselenide of an alkali metal such as sodium, potassium, or lithium sorbed into a zeolite molecular sieve carrier.

19 Claims, 3 Drawing Figures

ELECTROCHEMICAL CELL AND ANODE FOR AN ELECTROCHEMICAL CELL

This invention relates to an electrochemical cell, and to an anode for an electrochemical cell.

According to the invention there is provided an electrochemical cell comprising, in its charged state, an anode, a cathode, and an electrolyte, the anode comprising an alkali metal polysulphide or polyselenide sorbed in a zeolite molecular sieve carrier.

In an embodiment of the invention, the anode may comprise a mixture of alkali metal polysulphides and alkali metal polyselenides.

The cathode of the cell of this invention may be any electronegative substance which can form an effective electrochemical couple with the alkali metal of the anode.

In an embodiment of the invention the cathode may comprise as electrochemically active cathode substance a substance selected from the group comprising sulphur, selenium, phosphorus, or the like, or compounds containing these materials.

In an embodiment the cathode may, for example, comprise a mixture of sulphur and selenium.

On the basis of theoretical considerations, if the cell is cathode limited, in the ideal fully charged state of the cell, the electrochemically active substance of the cathode may be in the form of sulphur, selenium, or a mixture of sulphur and selenium.

The electrochemical cell of this invention may therefore be loaded in its charged state with the electrochemically active substance of the cathode being in the form of sulphur, selenium or a mixture of sulphur and selenium. During discharge of the cell alkali metal polysulphides and/or polyselenides will form at the cathode as a result of alkali metal ions migrating through the electrolyte from the anode to the cathode, and discharging at the cathode.

The cathode will thus become relatively richer in alkali metal content while the anode will become correspondingly poorer in alkali metal content during discharge of the cell.

Without wishing to be bound by theory, Applicants believe that the discharge process will continue until, in the fully discharged state of the cell, the alkali metal polysulphide and/or selenides in the anode and in the cathode will, under ideal conditions where the cell is neither anode nor cathode limited, have progressed to the stage where the alkali metal:sulphur and/or selenium ratios are the same or substantially the same.

During recharging of such a cell, Applicants believe that alkali metal ions will migrate from the cathode to the anode so that the cathode will become relatively poorer in alkali metal content and the anode will become correspondingly richer in alkali metal content.

In practice, however, Applicants believe that even in the fully charged state of the cell, the cathode will still contain residual alkali metal polysulphides and/or polyselenides.

The cathode may therefore conveniently be such that even in the charged state of the cell, the cathode comprises alkali metal polysulphides and/or polyselenides.

To facilitate manufacture of cell components and construction of cell in accordance with this invention, a single alkali metal polysulphide and/or polyselenide may be formed for use in constructing the anodes and cathodes. The anodes and cathodes may thus be loaded into the cells in their discharged state where the alkali metal:sulphur and/or selenium ratios in the anode and cathode are the same.

This provides the advantage that it avoids having to prepare separate alkali metal polysulphides and/or polyselenides having different alkali metal:sulphur and/or selenium ratios for the anodes and cathodes.

The cathode is such that the electrochemically active substance of the cathode will be held captive in the cathode at the operating temperatures of the cell, for the cell to operate effectively without significant loss of said substance during use.

In an embodiment of the invention, the electrochemically active substance of the cathode may be held captive in the cathode by being sorbed in a zeolite molecular sieve carrier.

While the zeolite molecular sieve carrier of the cathode need not be the same as the zeolite molecular sieve carrier of the anode, it may, in an embodiment of the invention, conveniently be the same.

In an embodiment of the invention, the electrochemically active substance of the cathode may be held captive in the cathode by being in the form of a compound with a transition metal which will be solid at the operating temperatures of the cell.

Thus, for example, the electrochemically active substance of the cathode may be in the form of a compound such as $TiS_2$, $FeS$, or the like.

In an alternative example of the invention the electrochemically active substance of the cathode may be held captive by being in the form of a compound with aluminium, such as, for example, aluminium sulphide, aluminium sulphur chloride, or the like.

In this embodiment of the invention, the cathode may again include a zeolite molecular sieve carrier wherein said electrochemically active compound is retained in a sorbed condition.

The cell of this invention may include a non-electron conductive alkali metal ion conductive barrier between the anode and the electrolyte to limit self-discharge of the cell.

In an embodiment of the invention, the barrier may comprise a layer of a suitable zeolite molecular sieve carrier.

Applicants do, however, believe that under certain conditions, a thin passifying layer of alkali metal sulphide, selenide, polysulphide and/or polyselenide which is solid at the operating temperatures of the cell, will form at the anode/electrolyte phase interface. Such a layer can provide a built-in mechanism to reduce self-discharge thereby improving the shelf life of the cell and thereby reducing the need for such an alkali metal ion conductive barrier.

On the basis of cost, availability, mass and degree of electropositivity, the alkali metal of the anode may conveniently comprise lithium, sodium or potassium, and preferably lithium or sodium, or alloys of these substances with one another.

The electrolyte of the cell of this invention may be any compatible electrolyte which will permit effective diffusion of alkali metal ions between the anode and cathode during use.

In an embodiment of the invention the electrolyte may comprise an alkali metal polysulphide and/or polyselenide.

In this embodiment of the invention, again to facilitate manufacture of cell components and cells in accordance with this invention, the alkali metal polysulphide and/or polyselenide of the electrolyte may conveniently correspond with the alkali metal polysulphide and/or polyselenide used for the discharged anode and cathode.

In an embodiment of the invention, the alkali metal polysulphide and/or polyselenide electrolyte may include a multiple alkali metal halide salt mixture to increase, if necessary, the ion conductivity of the electrolyte and/or to decrease the melting temperature.

While any suitable multiple alkali metal halide salt mixture may be included in the electrolyte, the mixture may, for example, comprise LiI:KI eutectic.

In an alternative embodiment of the invention, the alkali metal polysulphide and/or polyselenide electrolyte may include a further sulphide, polysulphide, selenide, and/or polyselenide compound which will have the effect of reducing the melting point of the electrolyte or increasing ionic conductivity, and thus the operating temperature of the cell.

Thus, for example, the further compound which may be included in the electrolyte may, comprise an aluminium-sulphide, -polysulphide, -selenide, and/or -polyselenide.

In an alternative embodiment of the invention, the electrolyte may be in the form of an electrolyte as hereinbefore described, which is dissolved in a suitable aprotic solvent.

The appropriate aprotic solvent will depend upon the specific electrolyte used.

Aprotic solvents which may be suitable for certain of the electrolytes may, for example, comprise propylene carbonate, tetrahydrofuran, N,N-dimethylacetamide, or the like.

In an alternative embodiment of the invention, the electrolyte may, for example, comprise a molten alkali metal halide salt which is doped with an aluminium halide (e.g. $AlCl_3$) or with some other appropriate dopant to reduce the melting point of the electrolyte.

Thus, for example, the electrolyte may be in the form of an alkali metal halide-aluminium halide mixture or a double salt or in the form of an alkaline earth halide-aluminium halide mixture or a double salt or a mixture thereof.

Thus, for example, the electrolyte may comprise $NaAlCl_4$; $LiAlCl_4$; $KAlCl_4$; $NaAlBr_4$; $LiAlBr_4$; $KAlBr_4$; $NaAlI_4$; $LiAlI_4$; $KAlI_4$; $Mg(AlCl_4)_2$; $Ca(AlCl_4)_2$; $Mg(AlBr_4)_2$; $Ca(AlBr_4)_2$; $Mg(AlI_4)_2$; $Ca(AlI_4)_2$, or the like, but alkali metal cations are preferred when the alkali metal is the same as that used for the anode.

Where the electrolyte is a mixture or a melt it may conveniently be an eutectic mixture or melt.

In an embodiment of the invention, the electrochemical cell may have its electrolyte sorbed in a zeolite molecular sieve carrier.

The zeolite molecular sieve carrier of the electrolyte need not correspond with that of the anode, but may conveniently correspond with that of the anode.

In a further embodiment of the invention, the electrochemical cell may include a solid alkali metal ion conductive electrolyte which is positioned between the anode and the electrolyte, and/or between the cathode and the electrolyte.

The solid electrolyte may be any suitable solid electrolyte such as, for example beta-alumina, nasicon (i.e. $Na_3Zr_2Si_2PO_{12}$), or some other solid electrolyte which will permit alkali metal ions to diffuse therethrough, but will protect the anode and/or cathode from contact with the liquid or molten electrolyte of the cell.

In an alternative embodiment, the electrolyte may be in the form of a solid alkali metal ion conductive electrolyte. It may conveniently be in the form of a solid electrolyte as hereinbefore described.

The invention further extends to an anode for use in an electrochemical cell as described herein, the anode comprising an alkali metal polysulphide and/or alkali metal polyselenide sorbed in a zeolite molecular sieve carrier.

The zeolite molecular sieve carrier of the cell of this invention may comprise natural or synthetic zeolites, modified zeolites which have been physically and/or chemically modified, or zeolite-like substances.

The term "zeolites" is meant to include the class of crystalline or amorphous natural or synthetic materials which contain aluminium and silicon in fairly definite proportions, and their analogues. For a more detailed discussion of zeolites reference can be made to the January 1975 publication of the International Union of Pure and Applied Chemistry entitled "Chemical Nomenclature, and Formulation of Compositions, of Synthetic and Natural Zeolites".

Zeolites contain sorbed water molecules which may be removed, usually reversibly, by heat and/or evacuation. Since electrochemical cells incorporating electrodes in accordance with this invention will usually not work effectively in the presence of even minor proportions of water, all references to zeolite molecular sieve carriers in this specification are to be regarded as reference to dehydrated or at least partially dehydrated zeolite molecular sieve carriers.

Zeolites are usually possessed of a reasonably ordered internal structure, exhibit a high internal surface area and are characterised by the presence of a multiplicity of regular arrays of molecular cavities.

It is believed that zeolites in their hydrated form can be represented by the following structural formula:

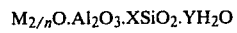

$M_{2/n}O.Al_2O_3.XSiO_2.YH_2O$ where M is a cation of n valence; and X and Y are independent variables that are a function of the composition of the starting mixture, and the manner of formation.

In an embodiment of the invention, the molecular sieve carrier may comprise dehydrated or partially dehydrated zeolite crystals selected from the group of naturally occurring zeolites such as faujasite and erionite, or from the group of synthetic zeolites such as zeolite 3A, zeolite 4A, zeolite 5A, zeolite 13X, or the like structures.

Zeolite 4A has the structural formula:

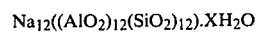

$Na_{12}((AlO_2)_{12}(SiO_2)_{12}).XH_2O$ wherein the value of X can vary.

Zeolite 4A has a window diameter of about 4 Angstrom units and a cavity volume of about 1000 cubic Angstrom units.

Zeolite 13X has the structural formula:

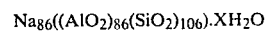

$Na_{86}((AlO_2)_{86}(SiO_2)_{106}).XH_2O$ where X can vary over a wide range. Zeolite 13X has molecular cavities with diameters of about 13 Angstrom units.

It has been found that suitable zeolite crystals should have a sufficiently high physical strength for effective use in an electrode. In addition, it has been found that zeolite crystals which have been doped with an electrochemically active substance or electrolyte should be sufficiently resistant to electrochemical damage during repeated use in a cell.

Thus physical or electrochemical failure of doped zeolite crystals should not be factors which contribute significantly, if at all, towards failure of a cell wherein doped zeolite molecular sieve carriers are used.

It should be noted that the metal cation of zeolites, whether doped or undoped, can generally be substituted by other cations in an ion-exchange process.

If such ion-exchanged zeolites were to be employed as cathodes in cells, with the substitute cations constituting the primary, and indeed only, electrochemical reactants of the cathodes, the cathodes will tend to collapse physically and/or chemically during use of the cells. This is due to the fact that the ion-exchanged zeolites form an integral part of the cathodes.

The collapse of the cathode will therefore be a major contributing factor towards failure of such a cell which employs such an ion-exchanged zeolite as a cathode. In addition, it is this collapse which will combat effective recharging of such a cell, thereby making it entirely impractical for use as a secondary cell.

This is in direct contrast with the instant invention where the zeolite molecular sieve carrier is designed to constitute an electrochemically inert frame for the electrode which does not partake significantly in the electrochemical reaction. It is therefore designed to remain physically and electrochemically stable so that it will not collapse significantly as a result of the electrochemical reaction during normal use.

This aspect should therefore be borne in mind in selecting the particular zeolite molecular sieve carrier for use with a selected electrochemically active substance in carrying out this invention.

It should be noted that in the case of some zeolites incidental cation exchange may occur during use of an electrode in accordance with this invention in some electrochemical cells. Thus, for example, lithium in an electrolyte can replace some sodium ions in a basic zeolite 3A lattice. Such reactions are well known and merely change the sizes of the windows and pores of the zeolite lattice. For example, if sodium ions are replaced by potassium ions in zeolite 4A, zeolite 3A is produced with the window sizes decreasing from 4 Angstroms to 3 Angstroms.

It should be appreciated, therefore, that while the zeolite molecular sieve carriers of this invention may, in certain instances, after doping or after having been subjected to several charge/discharge cycles in a cell, no longer strictly be in the form of zeolites as such, they may still be regarded as zeolites in the context of this invention since they exhibit the requisite zeolite properties.

Where the zeolite molecular sieve carriers of the electrodes and/or electrolyte of this invention are in the form of modified zeolites, they are such that while physically or chemically modified, they still possess appropriate molecular cavities for receiving and retaining the electrochemically active substances and/or electrolyte, and still possess pores which lead to the cavities and which have diameters of less than about 70 to 100 Angstrom units, and conveniently less than about 30 to 50 Angstrom units.

Where the zeolite molecular sieve carriers of this invention are in the form of zeolite-like substances, the zeolite-like substances are those which have cavities for receiving and retaining the electrochemically active substances and/or electrolyte, and which have pores leading to the cavities, with the pores having diameters of less than about 70 to 100 Angstrom units, and conveniently less than about 30 to 50 Angstrom units.

In an embodiment of the invention, the modified zeolites and the zeolite-like substances may conveniently be those having pore sizes of less than about 20 Angstrom units.

By taking into consideration factors such as pore size, cavity size, uniformity of pore and cavity size, the ability to sorb an electrochemically effective quantity of the electrochemically active substance and/or electrolyte, the ability to hold the substance and/or electrolyte captive under operating conditions, and the ability to allow effective diffusion of alkali metal ions, a rough guide will be provided for the selection of the zeolite molecular sieve carriers for particular applications in accordance with this invention.

Further factors which can serve as a guide, can be the degree of porosity, the density, the availability, the mechanical strength and the stability of a doped zeolite molecular sieve carrier.

Further factors which can serve as a guide will be, in the case of zeolite molecular sieve carriers for the anode or cathode of this invention, the electron conductivity of a doped zeolite molecular sieve carrier; whereas, when used as a carrier for the electrolyte, the requirement is that the doped zeolite molecular sieve carrier must be non-electron conductive.

The zeolite molecular sieve carrier of the electrodes should preferably therefore be such that the electrochemically active substance when sorbed therein, will be held therein in finely dispersed form and preferably in atomic, molecular, atomic cluster or molecular cluster form to present its greatest availability for electrochemical activity during use.

The zeolite molecular sieve carrier of the electrodes must further be such that it will hold an effective amount of electrochemically active substance captive for a sufficient period to allow the electrode to operate effectively in a cell for a reasonable period.

Conveniently, however, for the electrodes of this invention, the carrier may be such that the electrochemically active substance will be held captive during use of the electrode in a cell for which it was designed, throughout the normal operating temperature range of the cell, and without significant loss thereof during an appropriate operating period for the cell.

Applicants believe that these requirements can, in general, be provided by a number of suitable available natural and synthetic zeolites, so that these specific selection criteria will be of importance primarily in the case of modified zeolites and zeolite-like substances.

To operate effectively the zeolite molecular sieve carrier of this invention must permit appropriate ions to diffuse therethrough during use in a cell.

It follows that the zeolite molecular sieve carrier must therefore act as an ionic conductor when doped with the electrochemically active substance and/or electrolyte.

In general, the higher the ion conductivity the better will be the performance of the cell.

It follows automatically that the electrodes of this invention must be electron conductive. In this regard, it should be noted that natural and synthetic zeolites are, in general, poor electron conductors.

The zeolite molecular sieve carrier for the electrodes may therefore be selected so that it is sufficiently electron conductive when it has an effective quantity of the electrochemically active substance sorbed therein.

If this is not the case, an electron conductive material must be included in the electrodes.

The zeolite molecular sieve carrier electrodes of this invention will therefore, when necessary, or when desired, include a suitable electron conductive material to provide sufficient electron conductivity between individual crystals through the electrodes and hence to enhance the electron conductivity of the electrodes.

In an embodiment of the invention, the electron conductive material may be any suitable electron conductive material at the operating temperature of the cell, e.g. graphite, $MoS_2$, $TiS_2$, or the like.

Where the electron conductive material is in the form of graphite, it may be in the form of a porous coating on the zeolite molecular sieve carrier crystals, or in the form of a powder mixed with the crystals. By 'porous' is meant a coating that allows free access of the electrolyte into the zeolite pores, cavities or channels.

The graphite layer should be porous and conveniently the proportion thereof should be as low as possible consistent with effective electron conduction during use since graphite can act as an electrolyte barrier.

In practice therefore the proportion of electron conductive material to molecular sieve carrier, should be selected to provide a desired balance between electrolyte access and electron conductivity during use in a cell.

A further factor is that the total mass of the electron conductive material should be as low as possible to give the maximum energy to weight ratio.

In a series of experiments which were conducted, finely divided graphite in powder form was mixed with undoped zeolite crystals and pellets were formed containing various proportions of graphite and zeolite.

It was found that between about 5 and 16% of graphite had to be added to the zeolite to obtain a sufficiently electron conducting pellet for effective use.

Conveniently, however, substantially greater proportions of powdered graphite may be included if required.

In embodiments of the invention therefore, the electrode may include between 5% and 60% by weight of graphite powder.

For loosely compacted structures it will be appreciated that where the electrode comprises a mixture of graphite powder and zeolite crystals, if the graphite particle sizes are too small, electrolyte movement through the electrode will be retarded during use but electronic conductivity will be improved, and vice versa if the graphite particle sizes are too large. In practice therefore a suitable balance will have to be drawn in this regard.

Instead of using graphite in powder form, a series of experiments were conducted using graphite in the form of a colloidal suspension.

In the experiments, relatively low concentrations of the graphite colloidal suspension were used to treat zeolite samples. After drying it was found that the treated zeolite was electron conducting and it is believed therefore that a graphite coating must have been formed on the zeolite crystals.

Zeolite crystals may also be coated with graphite using other techniques such as, for example, vapour phase coatings.

In further examples of the invention, the zeolite molecular sieve carrier of this invention may be made electron conducting by cracking organic vapours such as tetrafuran on the crystal surfaces, cracking resins or pitches or organic compounds for example $C_6Cl_6$, $C_6I_6$, which have been mixed with zeolite crystals, cracking metal carbonyl vapours such as, for example, tungsten hexacarbonyl, or the like.

It follows that where the zeolite molecular sieve carrier is a non-electronic conductor and the sorbed electrochemically active substance is a poor electronic conductor there will be poor utilization of the sorbed active substance and a high internal cell resistance.

These limitations may be overcome by impregnating some of the zeolite molecular sieve carrier cavities with a current collector (which may or may not take part in the electrochemical action of the cell). This may conveniently be done before sorbing of the electrochemically active substance into the carrier.

The current collect may, for example, be in the form of silver, copper, titanium, nickel, aluminium, carbon, or the like. It is understood that such current collectors must remain electron conductive during use in the cell where it does take part in the cell reaction.

The zeolite molecular sieve carrier, electrodes and electrolyte of this invention may be in the form of self-supporting structures or matrices by being suitably compacted, by being suitably compacted with or supported by a binding agent, by being held in a supporting structure or matrix, by being contained in or located on a porous holder, or the like.

The molecular sieve carrier may be compacted before or after the electrolyte or electrochemically active substance has been sorbed therein, but conveniently after the substance has been sorbed therein.

The molecular sieve material or electrode or electrolyte phase, as the case may be, may for example be compacted by a pressing operation, by a hot pressing operation, by a sintering operation, by a sintering accompanied by a press operation, or the like.

The reason for performing these operations is to optimize volume, increase electron conductivity and to produce a required shape. The choice of the forming process will be defined by:

(a) the nature of the molecular sieve carrier and dopant in terms of its breakdown temperature and mechanical properties, (b) the physical shape/size required, (c) the electrochemical properties required.

Compaction may be carried out to provide discs, pellets, or tubes which have sufficient mechanical rigidity to be substantially self-supporting.

Compaction of the molecular sieve carrier or of the electrode, as the case may be, may therefore be carried out to balance the requirements of mechanical rigidity and improved electron conductivity against the requirement that electrolyte access to the electrochemically active substance within the electrode should be sufficient during use to provide a sufficient current density.

Where the molecular sieve carrier or the electrode, as the case may be, has been properly compacted, it can provide the advantage that the volume to mass ratio of the electrode has been improved. It can provide the further advantage that since enhanced electron conductivity can be provided, the relative mass of the electron conductive coating material may be reduced, thereby permitting the use of an electrode of a relatively reduced mass.

In addition, where the electrode or electrolyte phase is substantially self-supporting it can be handled more easily.

A cell in accordance with this invention may be used as a primary cell but will tend to have particular application for use as a secondary or rechargeable cell.

It will further be appreciated that cells in accordance with this invention can readily be assembled in battery form.

It will readily be appreciated that where a molten electrolyte is employed in the cell of this invention, the cell will be operated at a sufficient temperature for the electrolyte to be molten during use.

Applicants are aware of the fact that, in conventional cells, if the temperature of such cells including sodium polysulphides are allowed to drop below a threshold value, $Na_2S_2$ will usually tend to precipitate out irreversibly. Applicants believe, however, that where the polysulphides and/or polyselenides are sorbed in zeolite molecular sieve carriers, the tendency for $Na_2S_2$ to form, or if it does form, to form irreversible clusters will tend to be combatted since it will tend to be held in finely dispersed form in the zeolite molecular sieve carrier. Applicants believe therefore that formation of $Na_2S_2$ will not tend to be as harmful. This could, in practice, provide a substantial advantage.

Embodiments of the invention are now described by way of example with reference to the accompanying drawings, and with reference to certain experiments which have been conducted.

Figure 1:
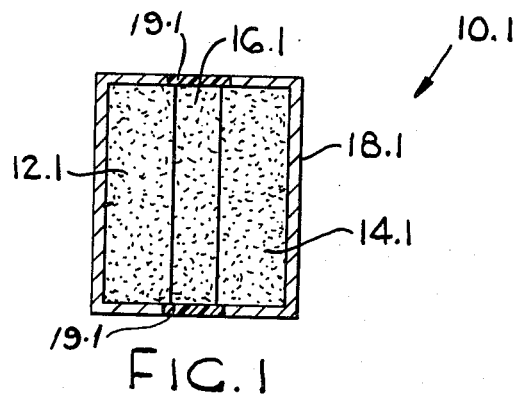
FIG. 1 shows a schematic arrangement of one embodiment of an electrochemical cell in accordance with this invention.

With reference to FIG. 1 of the drawings, reference numeral 10.1 refers generally to an electrochemical cell comprising an anode 12.1, a cathode 14.1, and an electrolyte 16.1.

The anode 12.1, the cathode 14.1 and the electrolyte 16.1 each comprise a sodium polysulphide sorbed in a dehydrated zeolite 4A molecular sieve carrier.

In the case of the anode 12.1 and cathode 14.1, the zeolite 4A includes graphite powder to make the electrodes electron conductive.

To manufacture the cell 10.1, a single sodium polysulphide was manufactured and was impregnated into zeolite 4A for the electrolyte, and into zeolite 4A including graphite powder for the electrodes.

The sorbed zeolite was then compressed into compact discs whereafter the electrode and electrolyte discs were assembled in a suitable electron conductive casing 18.1, in which the two parts are separated by any suitable electronic insulator 19.1.

The sodium polysulphide can be represented by the formula $Na_2S_x$. When the electrodes and electrolyte discs are loaded into the casing the cell will be in an uncharged state and the value of x will be the same in all three phases.

The cell 10.1 is operated at a temperature of 300° C. where the sodium polysulphide, such as $Na_2S_8$, is molten.

During charging of the cell, sodium ions will diffuse from the cathode to the anode. The value of x will therefore increase at the cathode and will decrease at the anode until the cell is fully charged. The composition of the electrolyte remains unchanged overall.

During discharge, sodium ions will diffuse from the anode to the cathode. The value of x will therefore increase at the anode and will decrease at the cathode.

In the fully discharged state of the cell, it is believed that the anode, cathode and electrolyte phases could again approach the stage where they have substantially the same x value if the cell is neither anode or cathode limited.

The sodium polysulphides thus act as an electrolyte since they are ion conducting in their molten state, but are also the electrochemical reaction products.

The embodiment of the invention as illustrated in FIG. 1 of the drawings can provide the essential advantages that the sodium polysulphides can readily and effectively be sorbed into the zeolite for effective use in the cell 10.1, that sodium ions can readily diffuse between the anode and the cathode during use, and that the sulphur can be held captive in finely dispersed form to provide 3-dimensional electrodes to which the electrolyte has free and effective access.

Applicants further believe that the embodiment of FIG. 1, using a rigid homogeneous zeolite matrix for the anode, cathode and electrolyte phase, can provide one or more of the following advantages:

(1) minimal physical expansion during charge and discharge and therefore little flaking and mechanical degradation;

(2) reduced corrosion since active materials are held captive by the zeolite;

(3) high current density because of the 3-dimensional electrodes;

(4) the cell can be inverted;

(5) cell casing can be light and relatively weak;

(6) the cell should be relatively safe; and (7) interface problems between the electrodes and electrolyte phase can be reduced.

In practice, the electrodes 12.1 and 14.1 would tend to be in the form of relatively thin pellets, plates or discs, having their maximum dimension faces separated by a thin electrolyte phase.

In an alternative embodiment of the cell 10.1, in addition to the sodium polysulphide electrolyte 16.1, the electrolyte may, for example, comprise $LiAlCl_4$, $NaAlCl_4$, or $LiAlCl_4$ or $NaAlCl_4$ sorbed in zeolite 4A, thereby permitting operation of the cell at a temperature of about 200° C.

Figure 2:
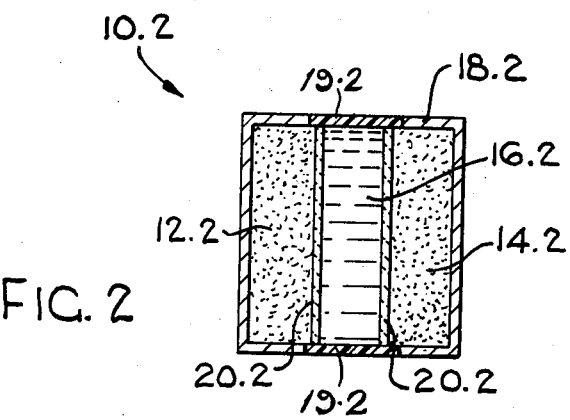
FIG. 2 shows a schematic arrangement of an alternative embodiment.

With reference to FIG. 2 of the drawings, reference numeral 10.2 refers generally to an electrochemical cell comprising an anode 12.2, a cathode 14.2, an electrolyte 16.2, and a pair of solid electrolytes 20.2, housed in a casing 18.2.

The anode 12.2 and cathode 14.2 each comprises lithium or sodium polysulphide sorbed in zeolite 4A, and the electrolyte 16.2 comprise $LiAlCl_4$ or $NaAlCl_4$.

The solid electrolytes 20.2 comprise beta alumina or nasicon.

Figure 3:
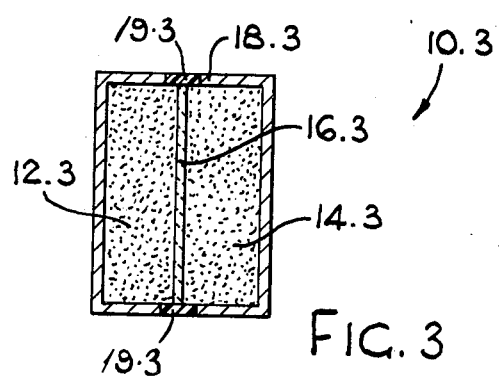
FIG. 3 shows a schematic arrangement of yet a further alternative embodiment.

With reference to FIG. 3 of the drawings, reference numeral 10.3 refers to yet a further electrochemical cell comprising an anode 12.3, a cathode 14.3 and a solid beta alumina electrolyte 16.3, housed in a casing 18.3.

The anode 12.3 comprises sodium polysulphide sorbed in dehydrated zeolite 4A, and the charged cathode 14.3 comprises sulphur doped with a minor proportion of selenium, or $TiS_2$ with a $NaAlCl_4$ electrolyte, or phosphorus sorbed in zeolite with a $NaAlCl_4$ electrolyte.

Applicants believe that the cells 10.2 and 10.3 can provide most of the advantages which can be provided by the cell 10.1.

Certain experiments were conducted with the two alternative types of cells as described with reference to FIG. 1 of the drawings. The average results of the experiments are set out below.

In the first series of experiments, with the electrolyte comprising sodium polysulphide sorbed in dehydrated zeolite 4A, the open circuit voltage was 1.6 volts, and the short circuit current was 0.1 amps.

The charging rate was 14 hours at 15 mA (0.21 A hr), whereas the discharge rate was 6.5 hours at 15 mA (0.10 A hr).

The first series of experiments showed that the various cell components are compatible and, despite mechanical difficulties unrelated to the electrochemical action of the cell, that the cell works.

The cell was operated at 300° C. for the polysulphide electrolyte to be molten and hence ion conducting. It was found that, at this temperature, the polysulphide of the electrolyte tended to break down into sulphur and a lower sulphur-containing polysulphide unless the cell is completely enclosed and at a uniform temperature.

In the second series of experiments a similar cell was employed except that in place of the electrolyte phase comprising sodium polysulphide sorbed in zeolite 4A, the electrolyte phase comprises $LiAlCl_4$, and the cell was operated at 200° C.

In the twenty second cycle of the cell, the open circuit voltage was 1.90 volts, while the short circuit current was 2.1 amps. The charging rate was 12.75 hrs at 26 mA (0.33 Ahr) while the discharging rate was 9 hrs at 32 mA (0.29 Ahr). The unexpectedly high open circuit voltage suggests the participation of the electrolyte in the cell reaction.

At the time of preparation hereof, this cell had been subjected to 75 continuous charge/discharge cycles and was still operating.

The second series of experiments demonstrated that the cell worked and that the components are compatible.

The experiments which have been conducted indicate that the experimental cells will benefit from optimization of electrode graphite to active material ratios. This will improve short circuit currents and sulphur utilization. Furthermore, the use of low melting point electrolytes will benefit the cells by lowering back-diffusion rates as well as corrosion rates on cell components. Further, by appropriate compaction (which was not possible in the experimental cells) much closer inter-crystal contact and hence better conductivities and volume efficiencies can be obtained.

The anodes in accordance with this invention provide the advantage that by using alkali metal polysulphides and/or polyselenides as electrochemically active materials, they can readily and effectively be sorbed into zeolite molecular sieve carriers thereby overcoming the difficulties which can be presented when attempting to sorb lithium and, in some cases, sodium, into zeolite molecular sieve carriers.

The anodes of this invention are therefore in the form of 3-dimensional anodes, thereby providing substantial advantages for cells in accordance with this invention incorporating anodes in accordance with this invention.

We claim:

1. An electrochemical cell comprising, in its charged state, an anode, a cathode, and an electrolyte, the anode comprising, as electrochemically active substances, an alkali metal and a chalcogen selected from the group consisting in sulphur and selenium, the alkali metal and chalcogen being combined together to form an alkali metal polysulphide or polyselenide, and being sorbed in a zeolite molecular sieve carrier in finely dispersed form, the chalcogen being held captive in the carrier and the alkali metal being capable of migrating in ionic form from the anode towards the cathode during discharge of the cell.

2. A cell according to claim 1, in which the cathode comprises as electrochemically active cathode substance a substance selected from the group consisting of sulphur and selenium which is held captive in the cathode.

3. A cell according to claim 2, in which the cathode comprises an alkali metal polysulphide or polyselenide.

4. A cell according to claim 2, in which the electrochemically active substance of the cathode is held captive in the cathode by being sorbed in a zeolite molecular sieve carrier.

5. A cell as claimed in claim 4, in which the cathode includes a suitable electron conductive material to enhance the electronic conductivity thereof.

6. A cell according to claim 2, in which the electrochemically active substance of the cathode is held captive in the cathode by being in the form of a compound with a transition metal.

7. A cell according to claim 2, in which the electrochemically active substance of the cathode is held captive in the cathode by being in the form of a compound with aluminium.

8. A cell according to claim 1, including an alkali metal ion conductive barrier between the anode and the electrolyte to limit self-discharge.

9. A cell according to claim 1, in which the alkali metal of the anode comprises lithium, sodium or potassium.

10. A cell according to claim 1, in which the electrolyte comprises an alkali metal polysulphide or polyselenide.

11. A cell according to claim 10, in which the electrolyte includes a multiple alkali metal halide salt mixture.

12. A cell according to claim 10, in which the electrolyte includes an aluminium-sulphide, -polysulphide, -selenide, or -polyselenide.

13. A cell according to claim 10, in which the electrolyte is dissolved in an aprotic solvent.

14. A cell according to claim 10, in which a solid alkali metal ion conductive electrolyte is positioned between the electrolyte and at least one of the electrodes.

15. A cell according to claim 1, in which the electrolyte comprises an alkali metal halide-aluminium halide mixture.

16. A cell according to claim 1, in which the electrolyte is sorbed in a zeolite molecular sieve carrier.

17. A cell according to claim 1, in which the electrolyte comprises a solid alkali metal ion conductive electrolyte.

18. A cell as claimed in claim 1, in which the anode includes a suitable electron conductive material to enhance the electronic conductivity thereof.

19. An anode for use in an electrochemical cell as claimed in claim 1, the anode comprising, as electrochemically active substances, an alkali metal and a chalcogen selected from the group consisting in sulphur and selenium, the alkali metal and chalcogen being combined together to form an alkali metal polysulphide or polyselenide, and being sorbed in a zeolite molecular sieve carrier in finely dispersed form, the chalcogen being held captive in the carrier and the alkali metal being capable of migrating in ionic form from the anode towards the cathode during discharge of the cell.

* * * * *